Nov. 20, 1956 R. W. HAMPTON 2,771,551

COUNTING CIRCUITS

Filed March 9, 1953

INVENTOR.

Robert W. Hampton

United States Patent Office 2,771,551

Patented Nov. 20, 1956

2,771,551

COUNTING CIRCUITS

Robert W. Hampton, Contra Costa County, Calif., assignor to Marchant Calculators, Inc., a corporation of California

Application March 9, 1953, Serial No. 340,983

9 Claims. (Cl. 250—27)

The present invention relates to calculating machines and more particularly concerns decade pulse counters for use in such machines.

A number of pulse counting circuits have been devised for use in calculating machines. One type of counting circuit comprises a plurality of stages of pulse-operated binary circuitry, each stage having a first, or "off," stable condition of operation representing the binary value 0, and a second, or "on," stable condition of operation representing the binary value 1. If several such binary stages are coupled together in cascade, they can be made to count input pulses in the binary system, such that the total number of input pulses is represented by the collective states of the stages. If "*n*" binary stages are coupled in this manner, they are capable of collectively representing $2^n$ different numeral values, as expressed in the decimal system. Each stage *n*, when it is in its "on" condition, may be said to represent the decimal value $2^{n-1}$. For example, four cascade-coupled stages are capable of collectively representing $2^4=16$ different numeral values, such as 0–15, each sixteenth count returning the circuit to its initial 0 condition. In such case, the four stages, when they are in their respective "on" conditions, always represent the respective decimal values $2^0$, $2^1$, $2^2$ and $2^3$, or 1, 2, 4 and 8. Various combinations of "on" and "off" stages are employed to represent intermediate values.

Four binary stages may be employed as a decade counter by reducing their normal sixteen-count cycle to a ten-count cycle. This is generally accomplished by modifying the circuit so that it is reset to its 0 condition on each tenth count, but executes the first nine counts in normal binary progression. Table I shows the combinations of "on" stages which represent the decimal values 0–9 in the normal binary progression of a counter having four stages A, B, C and D, representing the respective decimal values 1, 2, 4 and 8.

TABLE I

| | Stages | Decimal Values | | | | | | | | | |
|---|---|---|---|---|---|---|---|---|---|---|---|
| | | 0 | 1 | 2 | 3 | 4 | 5 | 6 | 7 | 8 | 9 |
| A | (1) | ---- | On | ----- | On | ----- | On | ----- | On | ----- | On |
| B | (2) | ---- | ----- | On | On | ----- | ----- | On | On | ----- | ---- |
| C | (4) | ---- | ----- | ----- | ----- | On | On | On | On | ----- | ---- |
| D | (8) | ---- | ----- | ----- | ----- | ----- | ----- | ----- | ----- | On | On |

From Table I, it is seen that when the normal binary progression is used, the decimal value 0 is represented when none of the stages is "on"; the values 1, 2, 4 and 8 are represented by one stage being "on"; the values 3, 5, 6 and 9 are represented by two of the stages being on; and the value 7 is represented by three of the stages being "on."

Normally, the pulse count information stored in such a circuit is transferred, or read out, into some device which is to use the information. It is obvious that it is more difficult to read out a numeral value represented by a combination of two electrical conditions than to read out a value represented by a single electrical condititon, and that it is more difficult yet to read out a value represented by a combination of three such conditions. The above described 1—2—4—8 code is therefore cumbersome for purposes of readout, since one of the digits (the digit 7) is represented by three signals.

Other four stage coded binary counters have been devised wherein the stages are permanently assigned codes, or sets of values, other than 1, 2, 4 and 8. For example, there are counting circuits based upon the codes 1—2—3—4, 1—1—2—5, 1—2—4—2, 1—2—4—5, and others. In each of these codes, the listed stage values are permanently assigned, i. e., the "on" condition of any stage always represents the same numeral value. Also, in each of the above codes, at least one of the digits 0–9 must be represented by three or more "on" stages, as an examination of these codes will show.

There have been disclosed a few four stage decade counters using codes in which all of the digits 0–9 can be represented by combinations of no more than two "on" stages. But, in each of these circuits, the values assigned to the stages are non-permanent, i. e., a given stage may represent one numeral value in a first combination of stages and an entirely different numeral value in another such combination. The difficulty of reading out a counted value from such a circuit is obvious; either the count must be repeated from zero, or completed to ten, or else a complex sensing circuit must be provided for determining thte ambiguous value of a given stage.

It has been discovered that there are binary decimal codes of the permanent value, four-signal type in which no more than two signals are required to express each decimal digit 0–9. One such code is 1—2—4—7 and another is 1—2—3—6. The present invention comprises a four stage pulse counting circuit based upon the 1—2—4—7 code. A circuit based upon the code 1—2—3—6 is disclosed and claimed in the copending application Serial No. 340,984, filed on even date therewith.

It is therefore a principal object of the present invention to count impulses in accordance with a four-signal decimal code, wherein each of the four signals has a permanently assigned numeral value and wherein each decimal digit 0–9 is represented by 0, 1 or 2 signals.

It is a more particular object to provide a four stage binary counting circuit wherein each stage has an "off" condition and an "on" condition, the respective stages representing, in their "on" conditions, the decimal values 1, 2, 4 and 7.

Other objects of the invention are:

To provide a novel counting circuit.

To provide a four stage counting circuit the operation of which is based upon a novel binary-decimal counting code.

To provide a novel reset circuit for a counting circuit.

To provide a counting circuit having improved readout characteristics.

To provide a novel method for storing representations of decimal digits.

To provide a novel method for decimal counting.

The underlying principle of the present invention is therefore the coding of a four stage binary counter in such a way that each stage, when it is in its "on" condition, represents a permanently assigned value, and no more than two "on" stages are required to represent any of the decimal digits 0–9.

Other objects and principles will be apparent from the following description with reference to the drawing, in which.

CIRCUIT ELEMENTS

*Trigger circuit*

Figure 1:
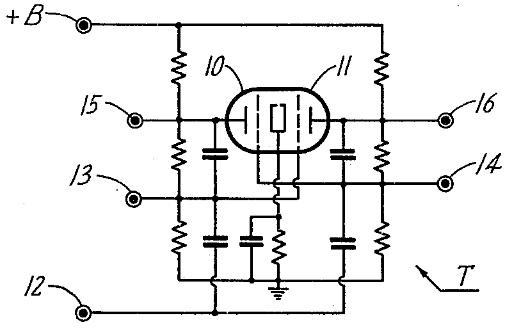
Fig. 1 is a wiring diagram of a typical trigger circuit as employed in the invention.

One of the basic elements employed in the present invention is a circuit having two stable states of operation, such, for example, as the well known Eccles-Jordan vacuum tube trigger circuit, a standard modification of which is shown at T in Fig. 1. A trigger circuit of this kind is shown and described in the copending application Serial No. 219,060, filed April 3, 1951 by G. V. Nolde et al., reference being made to the last-named application for a full description of the trigger circuit.

Briefly, the trigger circuit T comprises two amplifiers 10 and 11 which are shown, for convenience, as the two sections of a twin triode. The control grid of each amplifier is cross-coupled to the anode of the other amplifier, rendering the circuit stable in either of two conditions of operation, viz; with either section conducting and the other section nonconducting. The circuit will be described as in its "off" condition when the lefthand section 10 is conducting, and in its "on" condition when the righthand section 11 is conducting.

The trigger circuit T has an input terminal 12, hereinafter designated a "symmetrical" input, coupled to the grids of both sections. A positive pulse on terminal 12 causes the trigger circuit T to reverse its condition of operation. Alternatively, by proper choice of parameter values, the circuit may be made to respond to negative pulses only, or to both positive and negative pulses, on terminal 12.

A terminal 13, connected directly to the grid of amplifier 11, and hereinafter designated a "reset" terminal, is adapted to receive negative pulses for resetting circuit T to "off." It will be seen that a positive pulse applied directly to the grid of amplifier 10, as through a terminal 14, will also reset the circuit T to "off." In the following description, therefore, reference to a reset terminal will apply to a terminal 13 or a terminal 14, depending on the polarity of the available reset pulse.

A terminal 15, connected directly to the anode of the lefthand section 10 of circuit T is employed as a gate control terminal. The potential of terminal 15 is relatively low when section 10 is conducting (the circuit being in its "off" condition) and is relatively high when section 11 is conducting (the circuit being in its "on" condition). The high potential appearing at terminal 15 when circuit T is set to "on" may be employed for arming a gate in the manner described hereinafter.

Similarly, a terminal 16, connected to the anode of section 11, is at a relatively high potential when the trigger circuit is "off" and at a relatively low potential when the circuit is "on." Therefore, when the trigger circuit reverses from "on" to "off," there is a potential rise at terminal 16 which may be employed as a positive pulse output.

Figure 2:
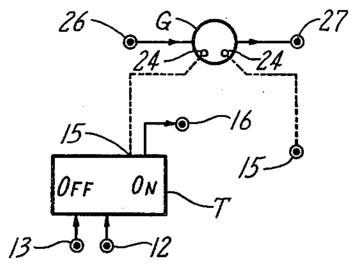
Fig. 2 is a block diagram showing the relationships between the various elements employed in the invention.

In Fig. 2, circuit T is shown as a rectangle with the symmetrical input 12 shown at the bottom center of the rectangle, the reset terminal 13 shown at the bottom left of the rectangle, and the output terminal 16 shown at the top right of the rectangle. Although the gate control terminal 15 actually is tapped from the lefthand trigger section, it is shown in Fig. 2 at the top right of the rectangle T since, as explained above, the higher control potential is available at terminal 15 for arming a gate when the trigger circuit is "on," i. e., when the righthand section is conducting.

*Gate*

Figure 3:
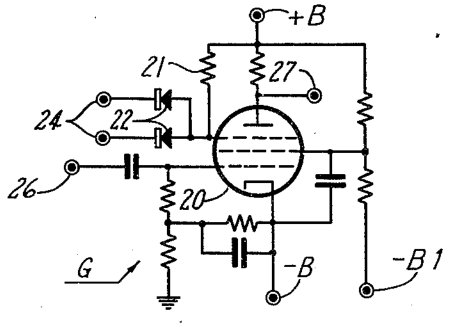
Fig. 3 is a wiring diagram of a typical gate as employed in the invention.

A second element employed in the present invention is a gate, an example of which is the pentode gate G shown in Fig. 3. Gate G comprises a pentode 20 which is normally biased well below cutoff by means of a source of potential —B1 connected to the screen grid. The suppressor grid is connected through each of a pair of rectifiers 22 to a respective arming terminal 24. Each arming terminal 24 is connected to a respective gate control terminal 15 of a trigger circuit. The suppressor grid is also connected through a resistor 21 to the anode potential source +B which is at a potential at least as high as the higher of the two potentials of a gate control terminal 15. It will be apparent that if either or both terminals 24 are at the lower control potential (due to the reset condition of one or both of the controlling trigger circuits), current flows from +B to the low potential terminal(s) 24 through resistor 21 and the related rectifier(s) 22, thereby maintaining the suppressor grid of pentode 20 at the lower control potential, due to the drop across resistor 21. In this condition, pentode 20 remains biased well below cutoff and gate G is unarmed, or closed. If both terminals 24 are at the higher control potential, i. e., if both controlling trigger circuits are "on," the reduced potential drop across resistor 21 raises the suppressor grid potential to the higher control level, thereby raising the bias of tube 30 to slightly below cutoff, in which condition gate G is armed.

Gate G is interrogated through a terminal 26 which is coupled to the control grid of pentode 20. A positive pulse impressed on terminal 26 when gate G is unarmed, or closed, does not bias tube 30 above cutoff. However, if a positive pulse is applied to terminal 26 when gate G is armed, the pulse is amplified, and an output pulse appears on an output terminal 27.

In Fig. 2, gate G is shown as a circle having within it two smaller circles representing the arming terminals 24, each of which is connected through a control lead to the gate control terminal 15 of a respective trigger circuit. (All control leads are shown as broken lines.) The input terminal 26 is shown on the lefthand side of gate G, while the output terminal 27 is shown on the righthand side of the gate.

COUNTING CIRCUIT

Figure 4:
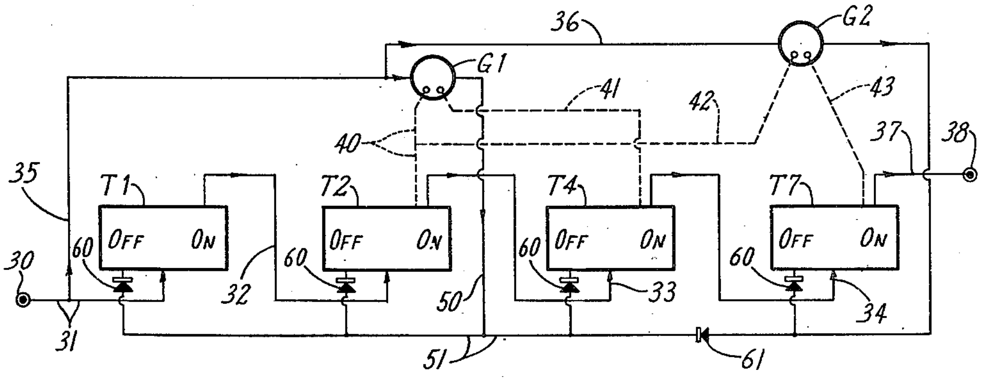
Fig. 4 is a block diagram of the counting circuit.

Referring to Fig. 4, the present counting circuit includes four binary counting stages T1, T2, T4 and T7, each of which comprises a trigger circuit of the type shown in Fig. 1. Each of the four stages is initially in its "off" condition, representing the decimal value 0. An input terminal 30 receives positive pulses that are to be counted and is connected by a lead 31 to the symmetrical input of the first stage T1. The output terminal of T1 is connected by a lead 32 to the symmetrical input of the second stage T2. Similarly, the output terminals of the second and third stages T2 and T4 are connected by two leads 33 and 34 to the respective symmetrical input terminals of the third and fourth stages T4 and T7. The output terminal of T7 is connected to a circuit output terminal, as described hereinafter.

The values of the trigger circuit parameters are selected, as previously described, such that each stage responds at its symmetrical input to positive pulses only. Each input pulse on terminal 30 reverses the condition of operation of T1, in the manner described above. The first input pulse on terminal 30 sets T1 to "on," and the second input pulse resets T1 to "off." It is recalled that when a trigger stage is reversed from "on" to "off," a positive pulse appears at its output terminal. Therefore, when T1 is reset to "off" in response to the second input pulse, a positive pulse is coupled from T1 to T2 by lead 32, setting T2 to "on," so that each second input pulse causes T2 to be reversed. By extending the normal binary progression, each fourth input pulse would cause T4 to be reversed and each eighth input pulse would cause T7 to be reversed. Therefore, if the four stages were permitted to count in their unmodified binary progression, the first nine counts would occur with the stages in their respective conditions of operation shown in Table I, supra, the "on" conditions of the stages then representing the respective decimal values 1, 2, 4 and 8.

In the present circuit, however, the normal binary progression is modified to change the "on" value of the fourth stage from 8 to 7 and to cause the entire counting circuit to be reset to 0 (all stages "off") upon completion of each tenth count. The circuit modifications are as follows.

A gate G1, of the type shown in Fig. 3, is interrogated by each input pulse through terminal 30, lead 31 and a lead 35. Output pulses from G1 are conducted by a lead 50 to a reset buss 51 which is connected to the reset terminal of each stage through a respective decoupling rectifier 60. (All rectifiers in Fig. 4 are shown, for purposes of illustration, with arrows pointing in the described direction of pulse flow, regardless of pulse polarity.) A rectifier 61 on the reset buss 51 prevents any pulse output from gate G1 from resetting T7. G1 is armed through two control leads 40 and 41 which are connected to the gate control terminals of T2 and T4, respectively. It is therefore seen that G1 is armed when both T2 and T4 are "on."

The first six pulses introduced through terminal 30 are counted in regular binary progression, so that after six counts stages T1, T2, T4 and T7 stand at "off," "on," "on" and off," respectively. Referring to Table I, supra, it is seen that T2 and T4 are both set to "on" after completion of the sixth count. This condition has been shown to arm gate G1. The seventh pulse sets T1 to "on" but is passed through G1 to lead 50 and buss 51, thereby resetting T1, T2 and T4 to "off." If there is any interference at T1 between the input pulse on lead 31 and the reset pulse on buss 51, the reset pulse prevails since it is amplified and applied asymmetrically; therefore, T1 is invariably reset to zero in response to the seventh count. When T4 is reversed from "on" to "off" during the seventh count, it transmits an output pulse on lead 34 to set T7 to "on." Therefore, at the end of seven counts, only the fourth stage is "on." The conditions of the respective stages at the completion of each count are shown in Table II, below.

It will be seen that the reset pulse need not be transmitted to all of the first three stages on the seventh count in order to perform the present coding. For example, if the reset pulse on lead 50 is delayed slightly, by any appropriate delay circuit, then T1 will be fully set to "on" by the seventh input pulse at terminal 30. In such case, the reset pulse on buss 51 may be applied only to T1, causing T1, T2, and T4 to be reversed to "off" in sequence, thereby reversing T7 to "on." Alternatively, the reset pulse may be applied to only T1 and T2 without any delay and the same result will be seen to occur. However, positive action is insured by applying the reset pulse to all of the first three stages.

TABLE II

| Stages | Decimal Values | | | | | | | | | |
|---|---|---|---|---|---|---|---|---|---|---|
| | 0 | 1 | 2 | 3 | 4 | 5 | 6 | 7 | 8 | 9 |
| T1 | ---- | On | ----- | On | ----- | On | ----- | ----- | On | ---- |
| T2 | ---- | ----- | On | On | ----- | ----- | On | ----- | ----- | On |
| T4 | ---- | ----- | ----- | ----- | On | On | On | ----- | ----- | ---- |
| T7 | ---- | ----- | ----- | ----- | ----- | ----- | ----- | On | On | On |

The eighth input pulse sets T1 to "on," and the ninth input pulse resets T1 to "off," thereby causing T2 to be set to "on," as shown in Table II.

In order to reset the circuit to 0 during the tenth count, a second gate G2 is armed during the ninth count to pass an input pulse on the tenth count for resetting all four stages to "off." The impulses at terminal 30 interrogate G2 through leads 31 and 35 and a lead 36, while the output from G2 comprises the reset buss 51. The first arming control terminal for G2 is connected to the gate arming terminal of T2 by lead 40 and a lead 42, and the second arming control terminal is connected to the corresponding gate arming terminal of T7 by a lead 43. Therefore, since T2 and T7 are both set to "on" after completion of the ninth count, G2 is armed and passes the tenth pulse to buss 51, thereby resetting all four stages to "off."

When T7 is reversed from "on" to "off" during the tenth count, the positive pulse on its output terminal is conducted through a lead 37 to a circuit output terminal 38. Therefore, a positive pulse appears at terminal 38 in response to each tenth count, and may be employed, for example, to operate a second decade counting circuit, or to perform a control function.

It will be seen from the foregoing description, with reference to Table II, that each decimal digit 0–9 is represented by the "on" condition of 0, 1 or 2 counting stages, and that no digit is represented by a combination of more than two "on" stages.

I claim:

1. In a counting circuit, the combination of: first, second, third and fourth counting stages, each stage having a first and a second stable state of operation and each stage being initially in its first state; an input pulse source connected to the first stage; means coupling the stages in cascade and operable in response to the input pulses for causing the stages to alternate between their two states in binary progression; a modifying circuit, including said coupling means, for preventing more than two of said stages from standing in their respective second states of operation in response to the application of any single number, 0–9, of input pulses to said first stage; and a circuit, including said modifying circuit, for establishing a permanent relationship between the second state of operation of each of said stages and the application of 1, 2, 4 and 7 input pulses, respectively, to said first stage.

2. In the counting circuit defined in claim 1, a circuit interconnecting certain ones of said stages and operable in response to the occurrence of a tenth input pulse for resetting all four stages to their respective first states of operation.

3. The counting circuit defined in claim 1, wherein each of said stages comprises a vacuum tube trigger circuit.

4. The counting circuit defined in claim 1, wherein the modifying means includes a gate.

5. In a counting circuit comprising four stages of circuitry, each stage having a first and a second stable state of operation, the combination of: means coupling said stages in cascade for reversing the state of each stage except the first in response to the reversal of the next preceding stage from its second to its first state; an input pulse source connected to the first stage for reversing the state of the first stage in response to the receipt of each input pulse; and a normally disabled means jointly controlled by at least two stages and enabled thereby, when the counting circuit is in a predetermined condition of operation, for resetting only the first three stages to their respective first states of operation in response to the occurrence of a seventh input pulse.

6. In the counting circuit defined in claim 5, a circuit interconnecting certain ones of said stages and operable in response to the application of a tenth input pulse for resetting all four stages to their respective first stages of operation.

7. In a counting circuit comprising first, second, third and fourth stages of circuitry, each stage having a first and a second stable state of operation; the combination of, means coupling said stages in cascade for reversing the state of each stage except the first in response to the reversal of the next preceding stage from its second to its first state, an input pulse source connected to the first stage for reversing the state of the first stage in response to the receipt of each pulse, a gate connected to the second and third stages and controlled thereby to be opened when the second and third stages are concurrently in their second states of operation, an input connection from the pulse source to the gate, an output circuit from the gate for receiving pulses from said source when the gate is open, and connections from said output circuit to the first three stages for resetting the first three stages to their respective first states in response to each pulse output from the gate.

8. In the counting circuit defined in claim 7, a circuit interconnecting certain ones of said stages and operable in response to the application of a tenth input pulse for resetting all four stages to their respective first states of operation.

9. In a counting circuit comprising first, second, third and fourth stages of circuitry, each stage having a first and a second stable state of operation; the combination of, means coupling said stages in cascade for reversing the state of each stage except the first in response to the reversal of the next preceding stage from its second to its first state, an input pulse source connected to the first stage for reversing the state of the first stage in response to the receipt of each pulse, a first gate connected to the second and third stages and controlled thereby to be opened when the second and third stages are concurrently in their second states of operation, a second gate connected to the second and fourth stages and controlled thereby to be opened when the second and fourth stages are concurrently in their second states of operation, a respective input connection from the pulse source to each of the first and second gates, a respective output circuit from each of the first and second gates for receiving pulses from said source when the related gate is open, connections from the output circuit of the first gate to the first three stages for resetting the first three stages to their respective first states in response to each pulse output from the first gate, and connections from the output circuit of the second gate to all four stages for resetting all four stages to their respective first states in response to each pulse output from the second gate.

References Cited in the file of this patent

UNITED STATES PATENTS

| | | |
|---|---|---|
| 2,521,350 | Dickinson | Sept. 5, 1950 |
| 2,521,774 | Bliss | Sept. 12, 1950 |
| 2,567,944 | Krause et al. | Sept. 18, 1951 |
| 2,574,145 | Freas | Nov. 6, 1951 |
| 2,604,263 | MacSorley | July 22, 1952 |
| 2,614,169 | Cohen et al. | Oct. 14, 1952 |
| 2,731,201 | Harper | Jan. 17, 1956 |